(12) United States Patent
Hashino et al.

(10) Patent No.: US 7,554,626 B2
(45) Date of Patent: Jun. 30, 2009

(54) LIQUID CRYSTAL DISPLAY DEVICE WITH WEDGE-SHAPED LIGHT-GUIDING PLATE

(75) Inventors: Naruo Hashino, Tottori (JP); Hiroki Sakemoto, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 611 days.

(21) Appl. No.: 10/551,470

(22) PCT Filed: Mar. 29, 2004

(86) PCT No.: PCT/JP2004/004435

§ 371 (c)(1),
(2), (4) Date: Sep. 30, 2005

(87) PCT Pub. No.: WO2004/088404

PCT Pub. Date: Oct. 14, 2004

(65) Prior Publication Data

US 2006/0215072 A1 Sep. 28, 2006

(30) Foreign Application Priority Data

Mar. 31, 2003 (JP) ............................ 2003-094036
Jun. 24, 2003 (JP) ............................ 2003-178980

(51) Int. Cl.
*G02F 1/1335* (2006.01)

(52) U.S. Cl. ............................ 349/65; 349/58; 349/61; 362/632; 362/633; 362/634

(58) Field of Classification Search .................. 349/58, 349/61, 65; 362/632–634
See application file for complete search history.

(56) References Cited

U.S. PATENT DOCUMENTS 5,838,412 A 11/1998 Ueda et al.
6,910,784 B2 * 6/2005 Ito ............................ 362/632
2002/0149713 A1 * 10/2002 Ishida et al. ................... 349/58

FOREIGN PATENT DOCUMENTS

JP 07-128680 A 5/1995

(Continued)

OTHER PUBLICATIONS

Patent Abstracts of Japan for 07-128680, published May 19, 1995.

(Continued)

*Primary Examiner*—David Nelms
*Assistant Examiner*—Nathanael R Briggs
(74) *Attorney, Agent, or Firm*—Katten Muchin Rosenman LLP

(57) ABSTRACT

A liquid crystal display device characterized in that an illumination unit includes a substantially wedge-shaped light-guiding plate 5 being tilted such that plate thickness becomes thinner from one side edge toward the other side edge, a light source 41 disposed along the thicker plate surface of the light-guiding plate, lead wires 43, 44 of the light source, and a housing 7 that houses these parts, in which the light-guiding plate is installed such that a gap $L_2$ between the backside 52 of the light-guiding plate and the bottom wall of the housing becomes larger as the plate thickness becomes thinner, and a portion of the lead wires resides in the gap $L_2$ and the wires are arranged along the other side edge 54 of the light-guiding plate. Further, it is preferable that a circuit board 11 for driving a liquid crystal display panel 2 be attached on the backside of the housing to lie parallel with the liquid crystal display panel and a guide member 7a for guiding connection of a main body side connector to a connector 11a of the circuit board be formed on the housing. With this constitution, a smaller and slimmer liquid crystal display device can be provided where the lead wires are easily arranged, and connection to connectors is highly facilitated.

7 Claims, 9 Drawing Sheets

FOREIGN PATENT DOCUMENTS

| | | |
|---|---|---|
| JP | 8-114802 | 5/1996 |
| JP | 9-138387 | 5/1997 |
| JP | 9-138388 | 5/1997 |
| JP | 10-161557 | 6/1998 |
| JP | 11-237630 | 8/1999 |
| JP | 11-271721 | 10/1999 |
| JP | 11-295713 | 10/1999 |
| JP | 2000-105543 | 4/2000 |

OTHER PUBLICATIONS

Notice of Reasons of Rejection for JP 2003-178980, dated Feb. 27, 2007.

International Search Report mailed Jul. 6, 2004.

* cited by examiner

LIQUID CRYSTAL DISPLAY DEVICE WITH WEDGE-SHAPED LIGHT-GUIDING PLATE

BACKGROUND OF THE INVENTION

This application is a national stage entry under 35 U.S.C. § 371 of PCT/JP04104435, filed Mar. 29, 2004, (designating the U.S.; and which published in Japanese in WO 2004/088404 on Oct. 14, 2004), which claims the benefit of Japanese Patent Application Nos. 2003-094036, filed Mar. 31, 2003 and 2003-178980, filed Jun. 24, 2003, the entire contents of both applications are expressly incorporated herein by reference.

1. Field of the Invention

The present invention relates to a liquid crystal display device, more particularly to a liquid crystal display device including a housing that covers the backside of a display section and a circuit board provided on the backside of the housing.

2. Prior Art

Liquid crystal display devices are widely used as display devices for cell phones, personal computers, car navigation systems, television sets, and various kinds of office automation equipment because they are lighter, consume less power and require less space compared to other display devices.

On the other hand, due to continuing innovations, multi-functional and high-powered equipment which are also economical and convenient to use have proliferated, but this has also led to a continuing demand for display devices that are lighter and occupy minimum space, have better quality and consume less power. For example, since the installation space for a liquid crystal display device used in car navigation systems of 1DIN (50 mm(height)×178 mm(width)) is limited, the need to come up with a slim and small display device which is at the same time easy to attach and impervious to dust has become imperative.

Further, an illumination unit provided with various kinds of light source is usually attached to liquid crystal display devices to realize a bright display screen, and the illumination unit irradiates the back of the display panel of the liquid crystal display device. The illumination unit is roughly classified in two different types depending on the attaching position of the light source. One is an edge light type where the linear light source is arranged along the surface of one side edge of a light-guiding plate, and the other is a direct type where the light source is arranged on the backside of the light-guiding plate. Between the two, the edge light type is largely adopted for equipment which give priority to slim profiles because of their superior features of slimness and uniformity of surface luminance. On the other hand, the direct type which provides a large-sized light source, is adopted for equipment requiring high levels of brightness.

Although these types of liquid crystal display devices have further become smaller, slimmer and lighter in recent years, devices equipped with a backlight have also become essential. It has become possible to make such devices smaller and slimmer by constructing individual parts constituting the backlight, such as the light source, light-guiding plate, a housing and the like, smaller, slimmer and lighter, and by arranging their wiring within the housing.

For example, Japanese Laid-Open Patent Publication No. 2001-249621 introduces an illumination unit that is designed to house lead wires connected to a light source efficiently in a housing.

The illumination unit UT, as shown in FIG. 8, includes a light source 102, a light-guiding plate 101 that guides the light coming from the light source 102, and a metal housing 104 arranged below and on the two short sides of the light-guiding plate 101 upon which the unit is constituted, and lead wires 103 connected to the light source 102 being sandwiched between the surface of one side of the light-guiding plate 101 and the housing 104, and the lead wires 103 are held by a plurality of protrusions K to prevent them from becoming disengaged from the housing.

However, since this illumination unit is designed in such manner that a gap is provided between the surface of one side of the light-guiding plate and the housing and the lead wires are housed in the gap, it is necessary to make the housing larger to provide for such housing space, and accordingly, the display device becomes larger.

Further, a small-sized backlight without using sheet wiring as electric wire to be connected to the light source is also disclosed in Japanese Laid-Open Patent Publication No. 2002-150823.

Such backlight, represented as backlight 110 in FIG. 9, includes a light-guiding plate 111 where the surface of the edge of one side thereof (hereinafter, the "Side Edge Surface") is an incident surface, a linear light source 112 provided in horizontal directions along the side edge surface being the incident surface, and a lead wire 113 is connected to one side in the longitudinal direction of the linear light source 112, and is extended to the other end in the longitudinal direction of the linear light source 112. Then, the light-guiding plate 111 has an inclined backside and is arranged in such manner such that its thickness diminishes as it is drawn away from the incident surface and the space below the backside of the light-guiding plate becomes larger as the thickness of the plate diminishes. Further, the lead wire 113 passes through the backside of the light-guiding plate 110 under the condition that a gap T from the incident surface is maintained and extends to the end of the other side of the linear light source 112 in the longitudinal direction, and is positioned in the space below the light-guiding plate, which space becomes larger as the light-guiding plate becomes thinner, and a part of the lead wire 113 is disposed above the lower portion of the side edge surface of the light-guiding plate, which is the incident surface.

The resulting display device with this kind of wiring structure is still quite thick because the lead wire is arranged below a lower frame at the gap T from the incident surface. However, if such thickness is reduced, the size of the lead wire is effectively restricted.

Further, this type of liquid crystal display device is provided with a connector for receiving signals for images or the like. The connector is provided on the backside of the liquid crystal panel in most cases, but such positioning gives rise to various problems.

For example, Japanese Laid-Open Patent Publication No. 2002-351349 discloses a liquid crystal display device where the connection state of the connector can be easily verified. Specifically, a liquid crystal cell and a backlight are enclosed by a frame, the top surface of the liquid crystal cell being covered with a front bezel cover (outer frame), while the bottom surface thereof is covered with a rear bezel cover, and a check hole corresponding to the connector of a control circuit board is formed somewhere on the rear bezel cover. As a result, the connection state of the connector can be easily determined through the check hole.

However, when the liquid crystal display device described in Japanese Laid-Open Patent Publication No. 2002-351349 is used for applications where slimness is required as in vehicular navigation systems, for example, since connection to the connector of the liquid crystal display device is provided on the backside of the liquid crystal display device and is done in such a manner that wiring is installed away from the dashboard of a vehicle, operability is very poor because the connector is invisible. Accordingly, breakage of the connector or defective connection occurs frequently.

DISCLOSURE OF INVENTION

Consequently, the present invention has been created to solve the problems existing in conventional art, and the object of the present invention is to provide a liquid crystal display device where wiring of lead wires is made easy and reduction of size and slimness are achieved, while at the same time, connection to a connector is facilitated.

The above-described objects of the present invention can be achieved by constituting the liquid crystal display device in the following manner.

Specifically, the liquid crystal display according to the present invention is a liquid crystal display device having a liquid crystal panel and an illumination unit for illuminating the liquid crystal display panel, in which the illumination unit includes a substantially wedge-shaped light-guiding plate having a backside being inclined so as to be thinner from one side edge to the other side edge, a linear light source disposed along a thicker plate surface at one side edge of the light-guiding plate, lead wires severally connected to both ends of the linear light source, and a housing for housing the members, whereby a groove is formed on the bottom wall of the housing such that a gap is created between the backside of the light-guiding plate and the bottom wall at a certain area portion of the light-guiding plate wherein the plate is the least thick, with a part of the lead wires residing in the gap and being arranged along the other side edge of the light-guiding plate, and made to extend to the outside from the backside of the housing.

According to this constitution, there is no need to provide additional space for arranging the lead wires between the housing and the light-guiding plate by making the light-guiding plate wedge-shaped such that the lead wires of the linear light source can be arranged at the bottom of thinner portion of the light-guiding plate, and thus a smaller and slimmer liquid crystal display device can be provided.

Moreover, in the liquid crystal display device according to the present invention, some of the lead wires are housed in a groove formed on the bottom wall of the housing, the wires extending to the outside of the housing through the groove, while a reflector having one end thereof bent into a substantially horseshoe shape is disposed on the backside of the light-guiding plate, and the linear light source and the edge of the thicker end of the light-guiding plate are inserted in the bent portion.

According to this constitution, the lead wires are affixed to the groove and will therefore not impede the assembly of the liquid crystal display device. Further, assembly of the linear light source and the light-guiding plate becomes easier because the reflector is shaped in the form of a horseshoe to support the linear light source and the light-guiding plate, thereby making assembly of the liquid crystal display device easier.

Furthermore, in the liquid crystal display device according to the present invention, a circuit board, upon which a circuit element for driving the liquid crystal display panel and the connector are mounted, is attached on the backside of the housing parallel to the liquid crystal display panel.

Further, in the liquid crystal display device according to the present invention, a guide member made of resin for guiding a main body side connector for connection to the connector is formed on the backside of the housing, the circuit board being fixed in a high-deck manner, and the guide member has an inclined plane extending toward one side facing the longer side of the connection port, and is formed integrally to the housing.

According to this constitution, since the circuit board is attached parallel to the liquid crystal display panel and the backside of the housing containing the guide member for guiding the main body side connector to the connector is inclined, the liquid crystal display device can be easily attached even where space is limited.

BRIEF DESCRIPTION OF THE DRAWINGS

FIG. 2 is a partial sectional view of FIG. 1, while

FIG. 8 shows a conventional illumination unit, where

FIG. 9 shows a conventional backlight, where

BEST MODE FOR IMPLEMENTING THE INVENTION

The first embodiment of the present invention will hereafter be described with reference to FIGS. 1 to 4.

Figure 1:
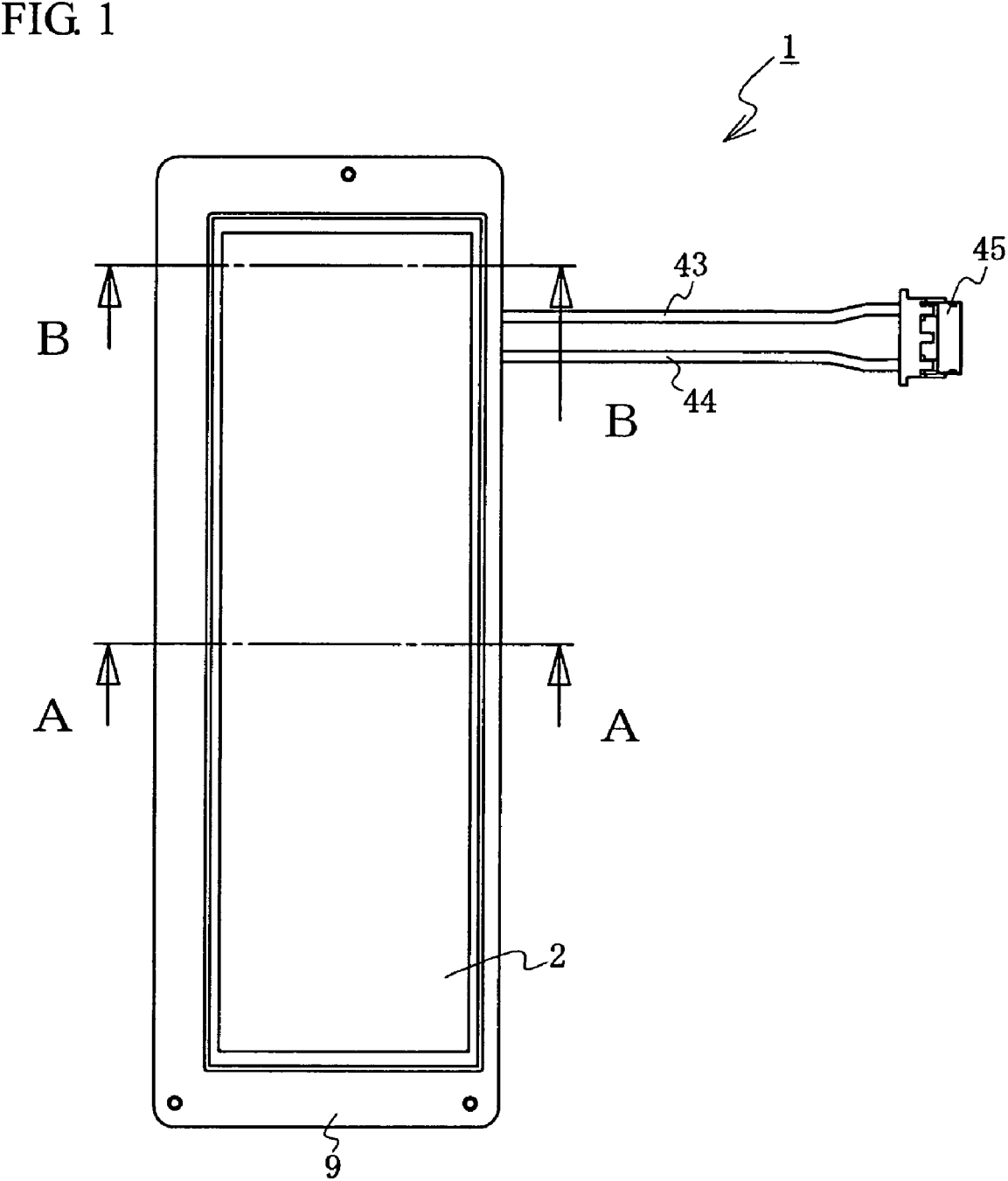
FIG. 1 is a front view showing an embodiment of the present invention.
Figure 2A:
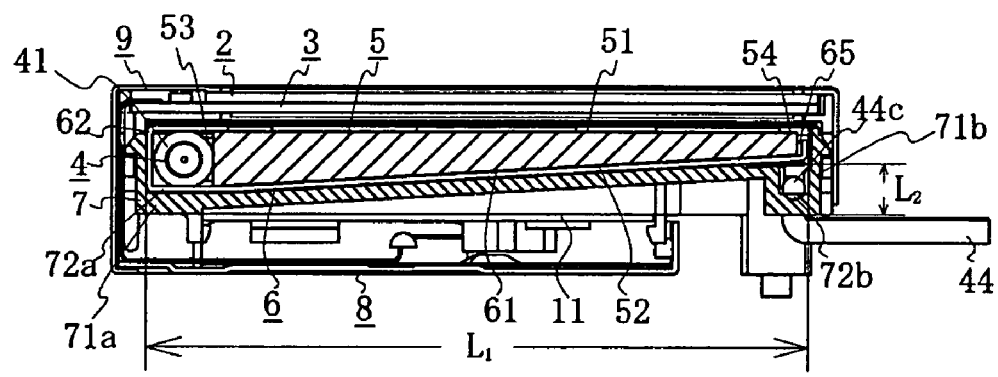
FIG. 2(A) is a sectional view taken along A-A of FIG. 1
Figure 2B:
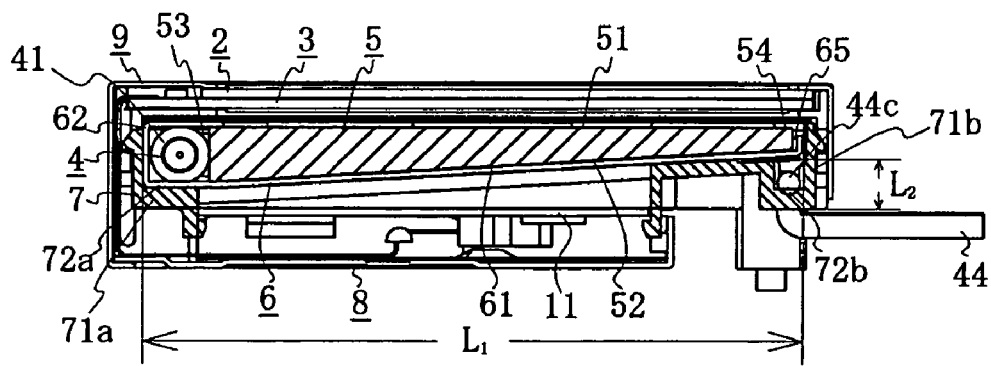
FIG. 2(B) is a sectional view taken along B-B of FIG. 1.
Figure 3:
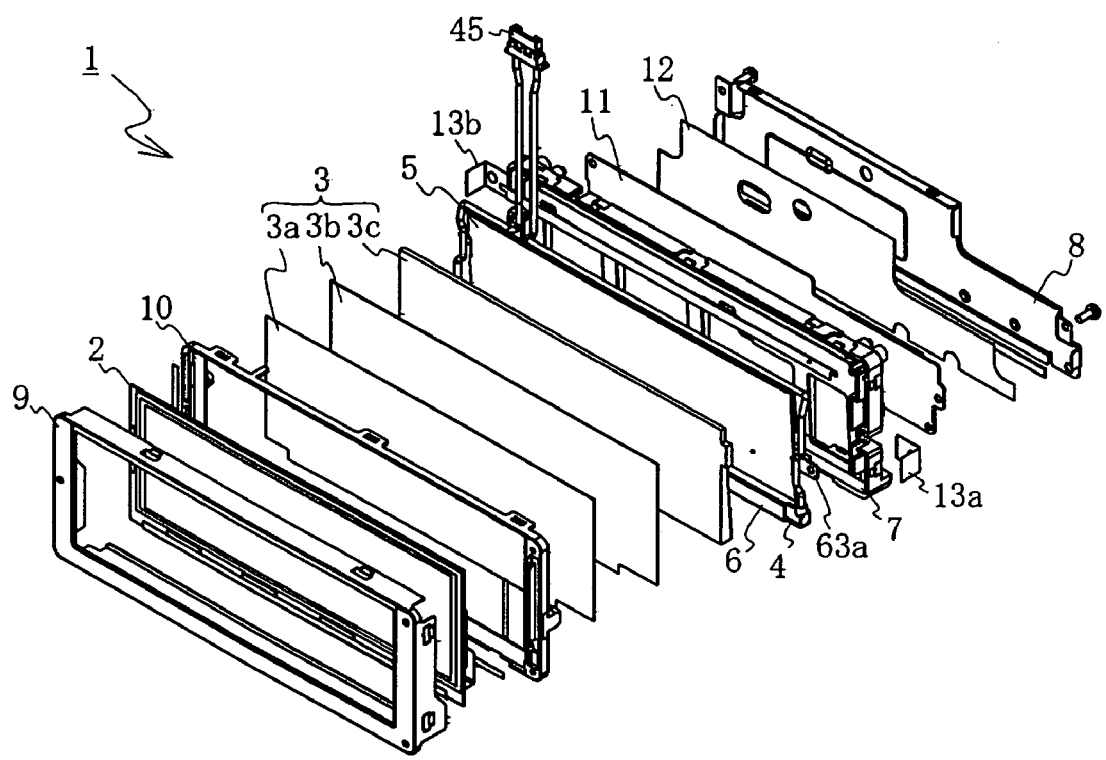
FIG. 3 is an exploded perspective view of FIG. 1.

A liquid crystal display device 1, as shown in FIGS. 1 to 3, consists of a liquid crystal display panel 2, a lamp set 4, a light-guiding plate 5 for transmitting light from a light source 41 of the lamp set, an optical sheet 3 arranged on a luminous surface of the front side of the light-guiding plate 5, a reflector 6 arranged on the backside of the light-guiding plate 5, a housing 7 in which members such as the lamp set 4, the light-guiding plate 5 and the reflector 6 are housed, an outer frame 9 for surrounding the periphery of the housing 7 and affixing the liquid crystal display panel or the like, a circuit board 11 installed on the backside of the housing 7, an insulating sheet 12, a protective cover 8 for covering the circuit board 11 and the insulating sheet 12, and the like.

The illumination unit comprises the optical sheet 3, the lamp set 4, the light-guiding plate 5, the reflector 6, and the like. Further, a circuit element for driving the liquid crystal display panel 2 and a connector connected to an external unit and the like are mounted on the backside of the circuit board 11 and affixed on the backside of the housing 7 so as to lie parallel with the liquid crystal display panel 2.

The liquid crystal display device 1 is preferable as a display device for car navigation use, being small enough to fit within a 1DIN size, and its display screen is 4.9 inches, for example.

The light-guiding plate 5, as shown in FIGS. 2 and 3, consists of a rectangular plate body formed of an acrylic resin material or the like, having substantially the same horizontal width and vertical width as the liquid crystal display panel 2. Its thickness is such that a flat front side 51 and a backside 52 thinner on one side edge 53 are formed to incline gradually toward the other side edge 54 in a direction orthogonal to the longitudinal direction, as shown in the sectional view of FIG.

2, and its sectional shape is substantially in the form of a wedge. The side edge 53 is formed to be substantially as thick as the diameter of the linear light source 41. In this manner, the side edge 53 serves as an incident surface while the front side 51 acts as a luminous surface of the light-guiding plate 5.

The optical sheet 3 consists of a stacked body of one diffusion plate 3c and a plurality of lens sheets 3a, 3b that are stacked on the light diffusion plate 3c. Note that the diffusion plate 3c and the lens sheets 3a, 3b are formed of a non-conductive material. The optical sheet 3 is affixed to a middle frame 10 when housed in the housing 7.

The reflector 6 to which a reflective material or the like is applied on the front side thereof reflects light that has entered from the incident surface 53 of the light-guiding plate 5 and sends it out from the front side 51 which is formed of a metal plate such as stainless steel. The reflector is shaped in such manner that a flat surface 61 substantially having the same size as that of the light-guiding plate 5 and inclined along the backside 52 of the light-guiding plate 5 is bent to form a bent portion 62 and acquire a horseshoe shape at one side edge of the longitudinal direction, and an opening is made inside the bent portion 62, and the linear light source 41 is housed in the bent portion 62.

By housing the linear light source 41 in the bent portion 62, noise generating from the linear light source 41 can be blocked. Further, the other side edge 64 is bent substantially by 90° from the flat surface 61, and a locking piece 65 for locking the other side edge 54 of the light-guiding plate 5 is formed thereon.

Figure 4:
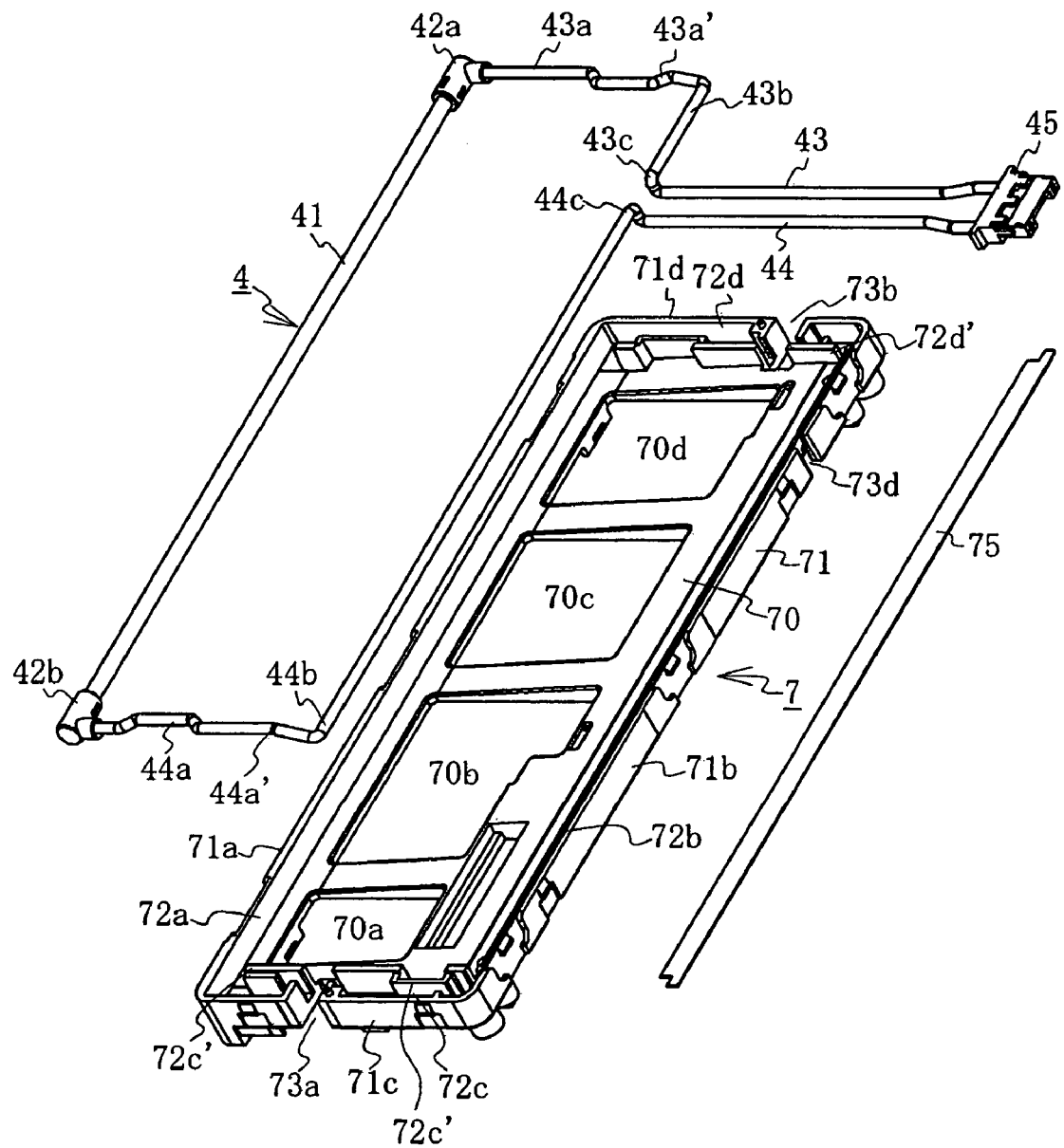
FIG. 4 is an enlarged perspective view where a few parts of FIG. 3 are extracted and enlarged.

As shown in FIG. 4, the lamp set 4 consists of the linear light source 41 and lead wires 43, 44 (hereinafter, referred to as the first and the second lead wires 43, 44) that are connected to the linear light source. A fluorescent lamp with a narrow diameter such as a cold cathode tube or a hot cathode tube is used as the linear light source 41, and it is turned on by a high-frequency AC power source. Although a straight line fluorescent lamp is preferable, an L-shaped or a U-shaped lamp can be also used. Further, lamp holders 42a, 42b with a circular sectional shape are attached on both ends of the fluorescent lamp 41, and the first and second lead wires 43, 44 are made to extend from the lamp holders 42a, 42b, respectively. The first and second lead wires 43, 44, are shaped in such manner that their cross-section is substantially circular or elliptical in shape and substantially have a diameter of 1.0 mm to 1.2 mm. Note that the dimensions of the lead wires are not limited to such measurements, since the flat type can be also used. The above-described first and second lead wires 43, 44 are bent into a predetermined shape when housed in the housing 7. Specifically, the first lead wire 43 consists of a short side portion 43a that is made to extend away from the lamp holder 42a, continuing along the short side of the light-guiding plate 5, extending to the long side portion 43b along the long side of the light-guiding plate 5, and a bent portion 43c that is bent from halfway the long side portion 43b to the backside and led out to the outside of the housing 7. Further, the second lead wire 44 consists of a short side portion 44a that is made to extend away from the lamp holder 42b, continuing along the short side of the light-guiding plate 5, extending to the long side portion 44b along the long side of the light-guiding plate 5, and a bent portion 44c that is bent from halfway the long side portion 44b to the backside and led out to the outside of the housing 7. Furthermore, an electric connector 45 is connected to the tips of the first and second lead wires 43, 44.

The first and second lead wires 43, 44 are led out to the outside by being bent at the bent portions 43c, 44c at the backside of the housing 7 for the purpose of improving operability in installing the liquid crystal display device. Further, the first lead wire 43 is formed slightly shorter than the second lead wire 44 because an opening 73d of the housing 7 is provided at a position slightly away from the center of a side 71 of one long side of the housing 7. In this case, it is preferable to connect the high voltage side of the linear light source 41 to the first lead wire 43 and to connect the low voltage side to the second lead wire 44.

The short side portions 43a, 44a are respectively provided with bent portions 43a', 44a' thereon as to be wound slightly and fit into thin panel-shaped protruding pieces 72c', 72d' that are formed in the housing 7. By providing the bent portions 43a', 44a', even if the lead wires are pulled when the wirings are arranged, the bent portions support the lead wires to disperse force to the bent portions, making it difficult for the force to be directly transmitted to the lamp holders 42a, 42b.

As shown in FIG. 4, the housing 7 is in the form of a shallow box with an open top surface, a bottom wall 70 and a peripheral wall 71 of a predetermined height connected to the bottom wall 70 in an erect manner, and made of a synthetic resin material. The peripheral wall 71 consists of long side-walls 71a, 71b and short sidewalls 71c, 71d joined integrally at corners. Further, openings 73a, 73b are formed on short sidewalls 71c, 71d, respectively, and ground portions 13a, 13b and earth terminals 63a, 63b (refer to FIG. 3, although earth terminal 63b is not shown) are inserted into the openings 73a, 73b, respectively. Furthermore, the opening 73d is formed on the long sidewall 71b, and the first and second lead wires 43, 44 are led away through the opening 73d to extend outside the housing 7.

An inclined surface matching the shape of the backside 52 of the light-guiding plate 5 is formed on the bottom wall 70. By providing the inclined surface, when the light-guiding plate 5 and the reflector 6 are mounted on the inclined surface, the flat surface 61 of the reflector 6, which is formed along the backside 52 of the light-guiding plate 5, comes into contact with the inclined surface so that the light-guiding plate 5 and the reflector 6 are stably fixed.

Further, recess grooves 72a, 72b are formed on the bottom wall 70 adjacent to the inner periphery wall surface of each of the long sidewalls 71a, 71b. Of these recess grooves, one recess groove 71a is formed to have width length to fit and house the horseshoe-shaped portion 62 of the reflector 6, and the groove width of another recess groove 72b is formed to have sufficient width length to house the first and second lead wires 43, 44. Meanwhile, instead of the recess grooves, protruding pieces (not shown) jutting from the bottom wall may be provided to form a space having a predetermined width corresponding to the protruding pieces and the inner periphery wall surface. Thin plate-shaped protruding pieces 72c', 72d' are provided in an erect manner remote from the inner wall surface of the short sides by a predetermined distance to form spaces 72c, 72d for housing the first and second lead wires 43, 44. Furthermore, a plurality of openings 70a to 70d having a predetermined size are formed on a portion of the bottom wall 70 excluding the vicinity of an inner periphery end.

On the recess groove 72b, hill-shaped convex portions (not shown) are formed on both sides of the opening 73d, intended to prevent dust from penetrating the groove 72b through the opening 73d. The hill-shaped convex portions are formed in such manner that they protrude upward from the bottom of the recess groove 72b and block a part thereof, leaving some space for the lead wires to pass through.

These parts of the liquid crystal display device are assembled in the following manner. Firstly, the lamp set 4 is assembled by installing the lamp holders 42a, 42b a on both ends of the fluorescent lamp 41 such that the first and second lead wires 43, 44 extend away from the fluorescent lamp 41, as shown in FIG. 4. Subsequently, the first lead wire 43 is bent so as to extend to the outside from one end of the lamp holder 42a through the short side portion 43a along the short side of the light-guiding plate 5, the long side portion 43b along the long side of the light-guiding plate 5, and the halfway 43c of the long side portion 43b. Further, the second lead wire 44 is also bent so as to extend to the outside from one end of the lamp holder 42b through the short side portion 44a along the short side of the light-guiding plate 5, the long side portion 44b along the long side of the light-guiding plate 5, and the halfway 44c of the long side portion 43b. Then, the electric connector 45 is connected to the tips of the first and second lead wires 43, 44. Note that the first and second lead wires 43, 44 may be bent when installing the wires to the housing 7.

The lamp set 4 having been assembled as described above, the fluorescent lamp 41 is then inserted into the horseshoe-shaped bent portion 62 of the reflector 6. Subsequently, the light-guiding plate 5 is inserted into the bent portion 62 from the thicker side end 53 and the thinner side end 54 is locked to the locking piece 65 of the reflector 6.

Then, the reflector 6 fitted with the light-guiding plate 5 is installed to the housing 7 by tilting it obliquely to fit the bent portion 62 into the recess groove 72a, while the lamp holders 42a, 42b of the fluorescent lamp 41 are also fitted into the groove 72a, and they are thus affixed. Then, the bent portions 43a, 43b of the first lead wire 43 are packed in the space 72d and the recess groove 72d. Since an opening is formed on the bottom of the recess groove near the opening 73d, the lead wire 43 is arranged within the opening of the concave groove 72b via the opening 73d, and it is led out to the outside from the backside of the housing 7. The bent portions 44a, 44b of the second lead wire 44 are also packed within the space 72c and the recess groove 72b, and the lead wire 44 is arranged in the opening on the bottom of the recess groove 72b via the opening 73d, and led out from the backside of the housing 7. Thereafter, the reflector 6 is made to recline from the tilted state, while the locking piece 65 of the reflector is pressed against the inner wall surface of the long sidewall 71b, and the reflector 6 is housed in the housing 7. On such occasion, the earth terminals 63a, 63b of the reflector 6 are inserted into the openings 73a, 73b of the housing 7.

Figure 8A:
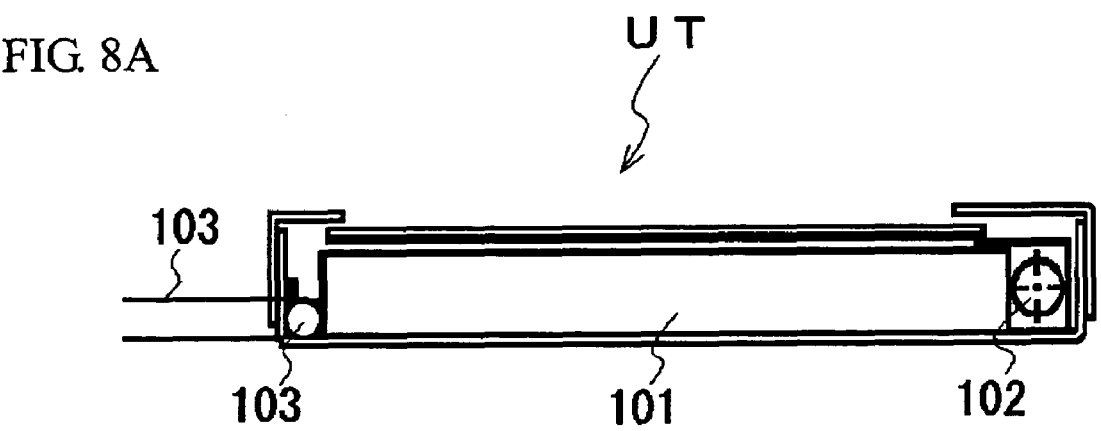
FIGS. 8(A) and 8(B) show sectional and plain views thereof, respectively.
Figure 8B:
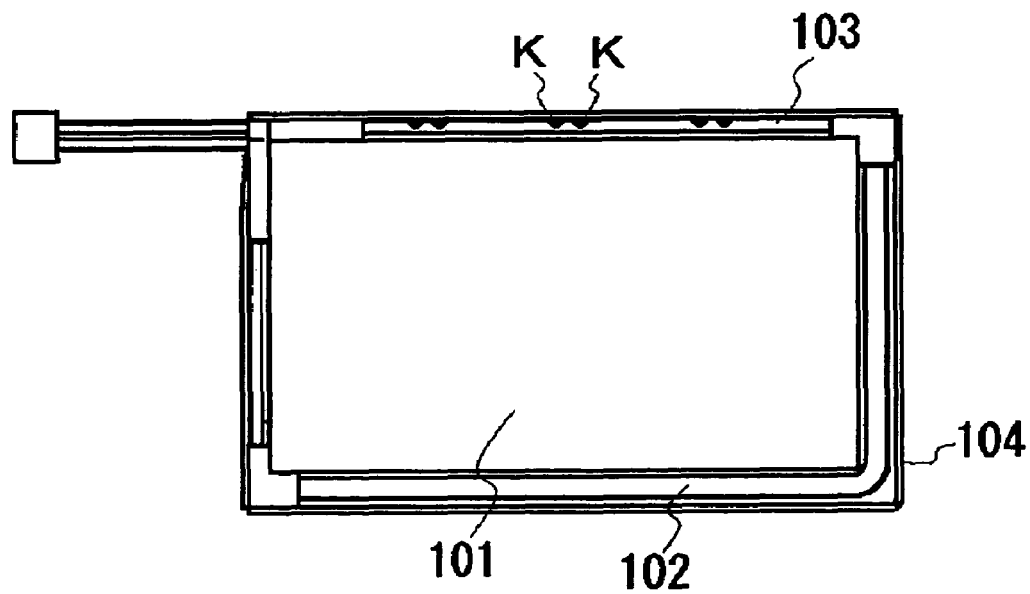
Figure 9A:
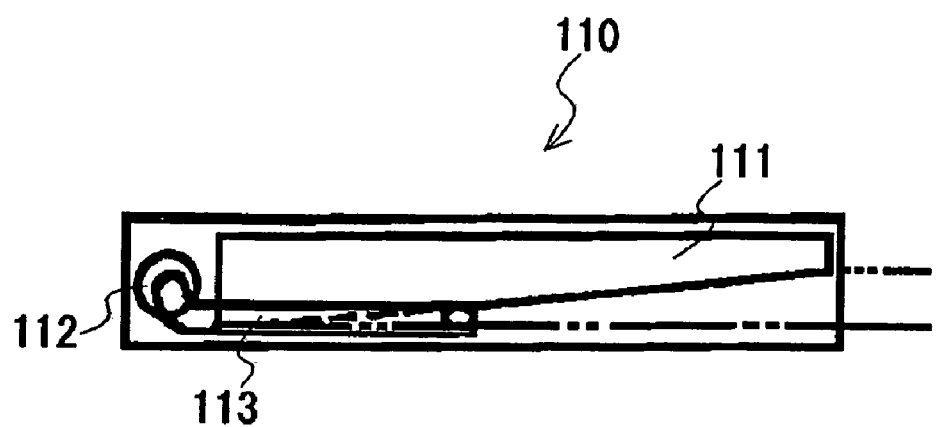
FIGS. 9(A) and 9(B) show side and plain views thereof, respectively.
Figure 9B:
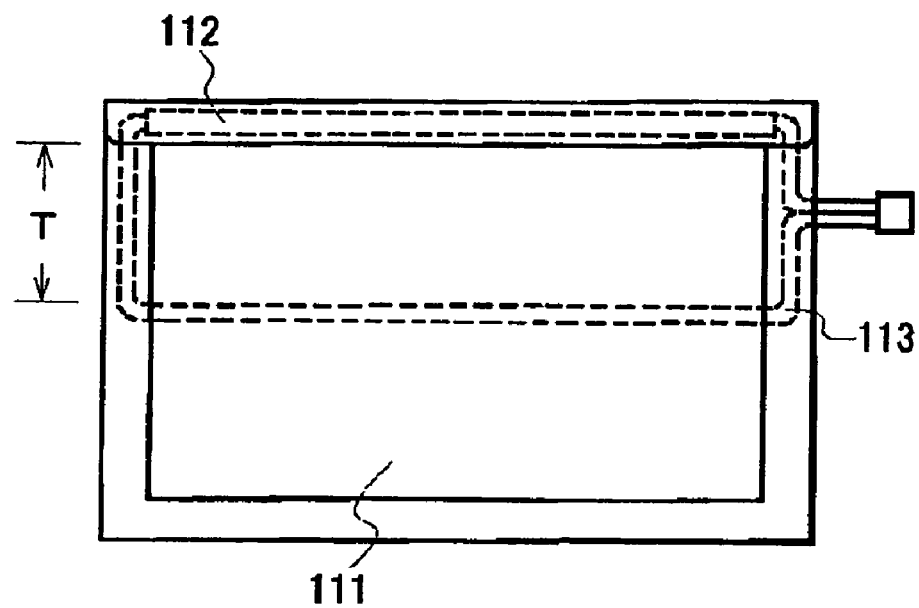

Incidentally, it is preferable to cover the recess groove 72b with tape 75 as shown in FIG. 4 after the lead wires 43, 44 are fitted in the recess groove 72b, to prevent the lead wires from protruding in subsequent assembly process. In addition, dust that has penetrated through the opening 73b can be prevented from entering through the gap between the reflector 6 and the housing 7. In the illumination unit of the conventional art shown in FIG. 8, dust can be prevented from entering the side of the light-guiding plate because a thin wall for fixing a light-guiding plate 101 is formed between the light-guiding plate 101 and a lead wire 103. However, it is highly likely that dust will enter the side of the light-guiding plate 5 through the gap between the reflector 6 and the housing 7 when the lead wire is arranged under the light-guiding plate 5, so that covering the groove 72b with the tape 75 is very effective for preventing dust from settling. To be specific, PET is preferable as tape 75 because of its adequate elasticity as compared to aluminum tape, thereby improving operability.

With this assembly, a gap $L_2$ is formed between the flat surface 61 of the reflector 6 and the bottom of housing 7, and the first and second lead wires 43, 44 are disposed in the recess groove 72b that has been provided in the widest area of the gap. Moreover, since the recess groove 72b is covered with the outer bottom surface of the other side edge 64 of the reflector 6, each of the lead wires 43, 44 is pressed by the bottom surface portion of the reflector 6 and does not protrude from the recess groove 72b.

Still further, the first and second lead wires 43, 44 are located substantially directly under the other end 54 of the light-guiding plate 5, and as shown in FIG. 2, are fitted into the horizontal width $L_1$ of the housing 7, as to make the horizontal width narrower. In addition, since the lead wires are arranged in the widest area of the gap, the thickness of the lead wires can be adjusted in accordance with the maximum width of the gap.

Thereafter, the optical sheet 3 and the liquid crystal display panel 2 are mounted on the front side 51 of the light-guiding plate 5, and the periphery of the assembly is framed by the outer frame 9. On the other hand, the circuit board 11 connected to the liquid crystal display panel 2 is arranged on the backside of the housing 7, while the protective cover 8 for protecting the circuit board 11 is installed on the bottom thereof to complete the liquid crystal display device.

Another embodiment of the present invention will be described hereafter with reference to FIGS. 5 to 7.

Figure 5:
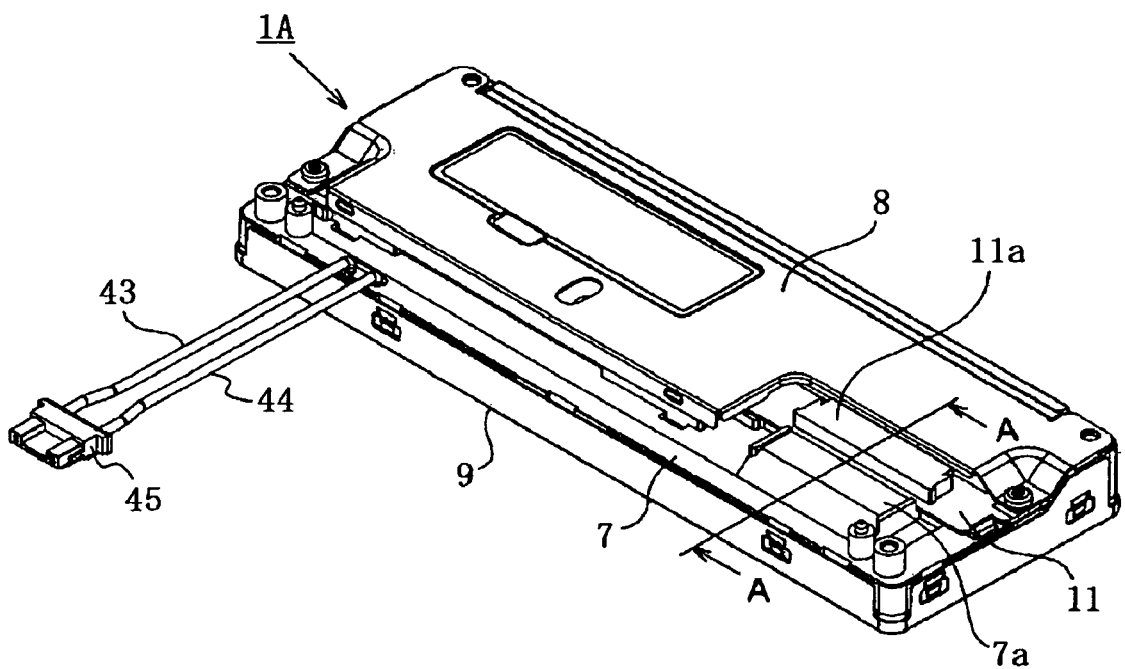
FIG. 5 is a backside perspective view showing another embodiment of the present invention.
Figure 6:
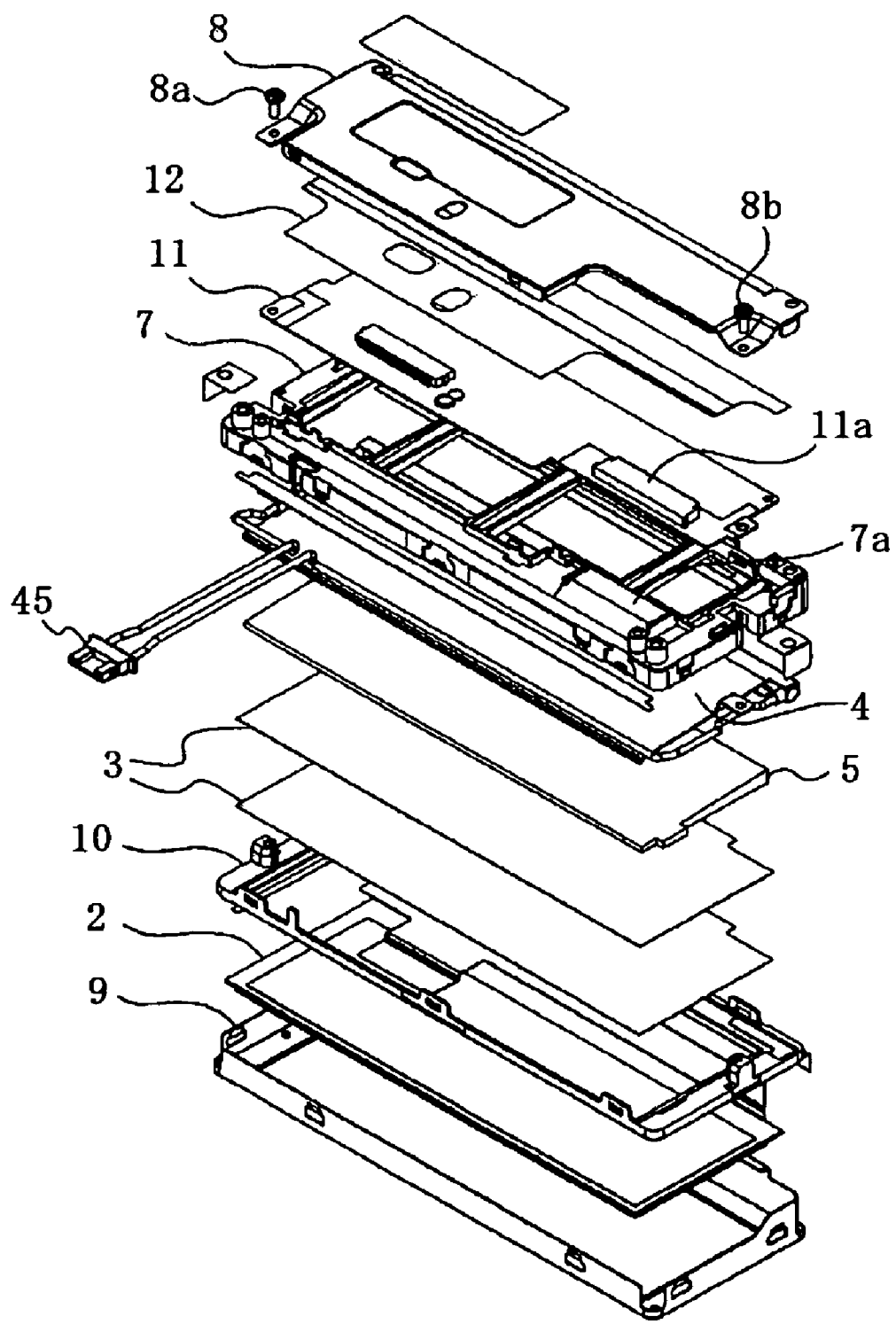
FIG. 6 is an exploded perspective view of FIG. 5.

As shown in FIGS. 5 and 6, a liquid crystal display device 1A is formed by sequentially stacking the metal outer frame 9, the liquid crystal display panel 2 for display, the middle frame 10 for fixing a sheet or the like, a plurality of the optical sheets 3, the light-guiding plate 5 whose cross-section is wedge shaped, the backlight 4 comprising a fluorescent tube being the light source, a reflector, the wirings 43, 44 for the fluorescent tube, the housing 7 fitted with the outer frame, the circuit board 11 for controlling the liquid crystal display panel 2, the insulating sheet 12, and the protective cover 8 for covering the circuit board 11 and the insulating sheet 12. These members are then fixed by screws 8a, 8b.

Incidentally, the liquid crystal display device 1A has the same shape as that of the liquid crystal display device 1 of the above-described embodiment except for the shape of its housing, so that the shape of the liquid crystal display device 1A will no longer be explained in detail.

The housing 7 of the liquid crystal display device 1A is in the form of a shallow box with an open top surface, provided with protruding pieces for positioning and fixing the circuit board 11 on the backside thereof, and made of a synthetic resin material. The circuit board 11 is installed on the backside of the housing 7 so as to be substantially parallel with the liquid crystal display panel 2.

A board side connector 11a for receiving video signals or the like sent from the outside of the liquid crystal display panel 2 is disposed on an area portion of the circuit board 11, with which the protective cover 8 does not overlap. The connection port of the board side connector 11a is provided near the edge of the circuit board 11. Further, the connection port of the board side connector 11a is provided in the direction where a main body side connector (not shown) is inserted in a fitted manner parallel with the flat surface of the circuit board 11 on a flat plate. In short, the connection port of the board side connector 11a lies horizontally with the circuit board 11.

Note that the main body side connector denotes a connector provided in a navigation system or the like where the liquid crystal display device 1A is built-in, and video signals or the like are sent to the board side connector 11a via the main body side connector.

A protruding guide 7a for supporting the main body side connector when it is connected to the board side connector 7a is formed on the housing 7 facing the connection port of the board side connector 11a. The guide 7a made of resin is integrated to the housing 7, and has a flat surface 7b extending toward the long side of the connection port of the board side connector 18a and a flat surface 7c extending toward the short side of the connection port of the board side connector 11a on both its right and left short sides (refer to FIG. 7). In connecting the connectors, the sides of the main body side connector are connected to the board side connector 11a as they are made to reside along the surfaces 7b, 7c.

As above-described, since the guide 7a is integrated to the housing 7, there is no added step to the manufacturing process nor resulting additional cost. Further, the main body side connector can be positioned in a direction perpendicular to the long side of the connection port because the flat surface 7b of the guide 7a faces the long side of the connection port of the board side connector, and at the same time the main body side connector can be positioned in a direction perpendicular to the short side of the connection port because the flat surface 7c of the guide 7a faces the short side of the connection port of the board side connector. In this manner, the main body side connector can be securely and easily connected even if the board side connector 11a is invisible, and breakage or defective connection of the connector can be prevented. This constitution is very effective particularly when the circuit board 11 is fixed in a high-deck manner.

Note that the flat surfaces 7b, 7c do not have to be flat, but may comprise gently curved surfaces extending toward the connection port. Further, the flat surface 7c located on the short side of the connector port need not have the same height as that of the short side near the connection port, and its height may be arbitrarily set as long as the flat surface serves as a guide.

Figure 7:
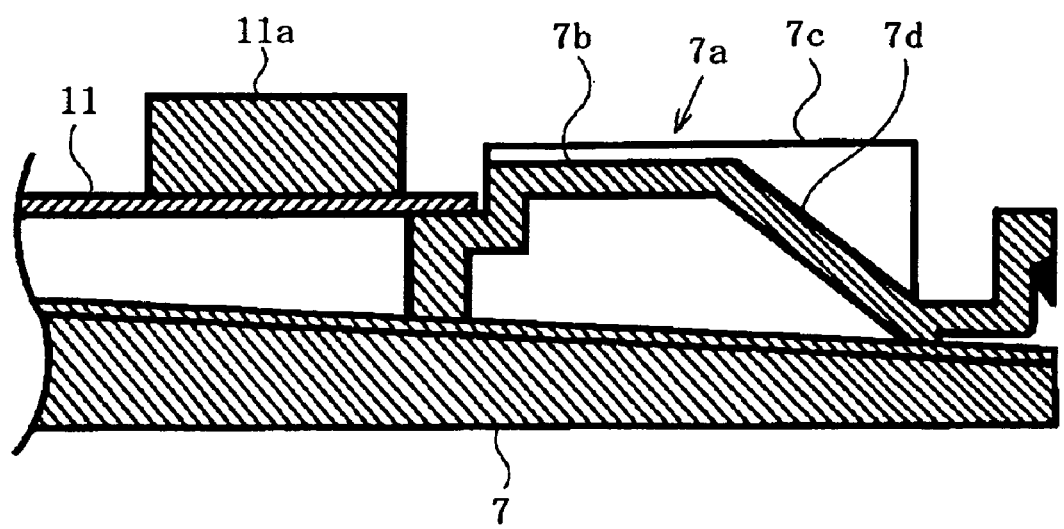
FIG. 7 is a sectional view taken along A-A of FIG. 5.

Furthermore, in this embodiment, the cross-section of the guide 7a is approximately trapezoidal while an inclined surface 7d is formed from the bottom portion of the housing 7 toward the end portion of the flat surface 7b as shown in FIG. 7. This structure allows the main body side connector to move along the flat surface 7b continuously from the inclined surface 7d in connecting connectors. Therefore, even in the case where the circuit board 11 is fixed at a position higher than the bottom portion of the housing 7 and the board side connector 11a is invisible or cannot be easily seen, the main body side connector can be connected easily and securely.

Although the guide 7a consists of the surfaces 7b to 7d in FIG. 7, the flat surface 7c functions as a guide when it is provided at least on one end of the surface 7b.

The liquid crystal display device can be effectively used in equipment where connection is performed without looking at the connector provided on the backside thereof, and can be used as a display device not only for in-vehicle navigation systems but also for home electric appliances such as a rice cooker.

What is claimed is:

1. A liquid crystal display device having a liquid crystal panel and an illumination unit for illuminating the liquid crystal display panel, wherein the illumination unit includes a substantially wedge-shaped light-guiding plate having a backside being inclined so as to be formed thinner from one side edge to the other side edge, a linear light source disposed along a thicker plate surface at one side edge of the light-guiding plate, lead wires severally connected to both ends of the linear light source, and a housing that houses the light-guiding plate and the linear light source, and a groove is formed on the bottom wall of the housing such that a gap is created between the backside of the light-guiding plate and the bottom wall at a certain area portion of the light-guiding plate wherein the plate is the least thick, with a part of the lead wires residing in the gap and being arranged along the other side edge of the light-guiding plate, and made to extend to the outside from the backside of the housing.

2. The liquid crystal display device according to claim 1, wherein a portion of the lead wires is housed in a groove formed on the bottom wall of the housing, and the wires are led out to the outside through the groove.

3. The liquid crystal display device according to claim 1, wherein a reflector is disposed on the backside of the light-guiding plate, having a bent portion where one end of the reflector is bent to be shaped substantially in the form of a horseshoe, and the linear light source and the thicker end edge of the light-guiding plate are inserted in the bent portion.

4. The liquid crystal display device according to claim 1, wherein a circuit board, on which a circuit element for driving the liquid crystal display panel and a connector are mounted, is attached on the backside of the housing to lie parallel with the liquid crystal display panel.

5. The liquid crystal display device according to claim 4, wherein a guide member for guiding a main body side connector to the connector for connection is formed on the backside of the housing.

6. The liquid crystal display device according to claim 4, wherein the circuit board is fixed in a position higher than a bottom portion of the housing, and the guide member has an inclined plane extending toward one side facing the longer side of the connection port.

7. The liquid crystal display device according to claim 5, wherein the guide member is made of resin, and formed integrally to the housing.

\* \* \* \* \*